United States Patent [19]

Sigley

[11] Patent Number: 4,702,011

[45] Date of Patent: Oct. 27, 1987

[54] SEXTANT HAVING A MICROPROCESSOR FOR CALCULATING THE POSITION OF HEAVENLY BODIES

[76] Inventor: Gordon B. Sigley, 3 O'Grady Drive, Paradise Point, Queensland, Australia, 4127

[21] Appl. No.: 916,496
[22] PCT Filed: Jan. 16, 1986
[86] PCT No.: PCT/AU86/00011
   § 371 Date: Sep. 15, 1986
   § 102(e) Date: Sep. 15, 1986
[87] PCT Pub. No.: WO86/04408
   PCT Pub. Date: Jul. 31, 1986

[30] Foreign Application Priority Data

Jan. 16, 1985 [AU] Australia .................... PG8907

[51] Int. Cl.$^4$ .................... G01C 1/08; G02B 23/12
[52] U.S. Cl. .................... 33/268; 364/455
[58] Field of Search ............ 364/443, 455; 33/267, 33/268

[56] References Cited

U.S. PATENT DOCUMENTS

| 2,941,082 | 6/1960 | Carbonara et al. | 33/268 X |
| 3,027,797 | 4/1962 | Collen et al. | 33/268 X |
| 3,571,567 | 3/1971 | Eckermann | 33/268 |
| 3,854,037 | 12/1974 | Feldman et al. | 364/455 |
| 3,968,570 | 7/1976 | Leuchter | 33/267 |
| 4,104,722 | 8/1978 | Evans | 33/266 X |

FOREIGN PATENT DOCUMENTS 3509449 9/1985 Fed. Rep. of Germany.
2069695 8/1981 United Kingdom.

*Primary Examiner*—William D. Martin, Jr.
*Attorney, Agent, or Firm*—Fleit, Jacobson, Cohn & Price

[57] ABSTRACT

A sextant having a telescope, a fixed split horizon mirror, a pivotal index arm supporting an index mirror and a stepping motor coupled to the index arm to cause rotation thereof on receipt of control pulses, the number of pulses applied to the stepping motor being proportional to the angle of the resultant pivotal movement of the index arm and thus the altitude angle of a heavenly body being observed through the sextant telescope. A microprocessor is programmed with information relating to the position data of heavenly bodies and monitors the pulses applied to the stepping motor and is arranged to calculate in accordance with known navigational equations, lattitude and longitude from time data and pulses applied to the stepping motor indicative of the altitude angle of the heavenly body being observed.

9 Claims, 12 Drawing Figures

SEXTANT HAVING A MICROPROCESSOR FOR CALCULATING THE POSITION OF HEAVENLY BODIES

TECHNICAL FIELD

THIS INVENTION relates to improvements to navigation systems and in particular to improvements to celestial navigation systems.

BACKGROUND ART

Commonly, celestial navigation is carried out by employing a sextant which is used to measure at any one time the angle of a heavenly body such as the sun to the horizon. This can be either achieved by the use of marine type sextant which is used to measure the angle relative to the true horizon or a bubble-type sextant which measures the angle relative to an artificially-created horizon. In order to plot a position having measured the angle as above, it is necessary to accurately record and/or calculate the Greenwhich Mean Time at which the sight was taken after which it is necessary to resort to a Nautical Almanac which lists the position or each heavenly body in the sky for each second of each minute of each day of the year and tables such as Sight Reduction Tables to calculate the true position of the vessel or aircraft.

The above common method, whilst in general if accurately carried out enables the position of a craft such as a marine craft or aircraft to be accurately determined, suffers from a number of disadvantages. Firstly, there is the obvious disadvantage that the sextant must be used correctly so as to accurately measure the angle of the heavenly body to the horizon. Secondly, it is necessary to employ an accurate chronometer or other timing means which indicates the exact time at which the sight is taken. Furthermore, there must be a direct and accurate correlation between the time at which the sight is taken and the time noted on the chronometer to ensure an accurate fix. This often requires the use of two persons one who uses the sextant to measure the angle of the heavenly body and the other of whom reads the correct time on being given a signal by the person using the sextant. Having obtained the time and angle readings it is then necessary to resort to the requisite tables and Nautical Almanac to plot the required position. This can be a time consuming process and a process which can be prone to errors.

DISCLOSURE OF INVENTION

The present invention aims to overcome or alleviate at least some of the above disadvantages by providing an improved means of celestial navigation which is based on the use of a sextant type instrument but which eliminates the need for separate persons to measure the angle of the heavenly body and the time of the fix and which also eliminates the calculations associated with plotting the true position of the craft. The system of the present invention also enables the geographical position of a craft ,to be obtained accurates and rapidly. The present invention also provide sextant for use in such a system.

With the above and other objects in view, this invention resides broadly in a navigation system including a sextant of the type having an eye piece, a fixed horizon mirror aligned with said eye piece and a movable index mirror arranged to have its position varied to permit determination of the altitude angle of a heavenly body being observed, drive means associates with said index mirror and arranged to vary the position of said mirror, means for generating signals for actuating said drive means, said signal generating means providing signals proportional to the angle of movement of said index mirror and thereby signals proportional to the altitude angle of said heavenly body being observed, and calculating means operable to calculate from said signals, the reading of chronometer means at the time and date said body is observed, and stored data relating to the position of said body, said geographical position.

Suitably the drive means comprises a stepping motor which converts digital information into proportional mechanical movement and the signal generating means comprises a source of control pulses, the nubmer of pulses applied to the stepping motor being indicative of the extent of rotation of the stepping motor spindle and thus the angle through which the index mirror is moved. Preferably the stepping motor is supported on the index arm of the sextant and is coupled to the sextant micrometer to cause pivotal movement of the index arm when actuated.

The present invention also provides a sextant of the type having an eye piece, a fixed horizon mirror aligned with said eye piece and a movable index mirror arranged to have its position varied whereby to permit determination of the altitude angle of a heavenly body being observed, drive means associated with said index mirror and arranged to vary the position of said mirror, means for generating signals for actuating said drive means, said signal generating means providing signals proportional to the angle of movement of said index mirror and thereby signals proportional to the altitude angle of said heavenly body being observed and means for converting said signals into data indicative of said altitude angle.

BRIEF DESCRIPTION OF DRAWINGS

In order that the invention may be more readily understood and put into practical effect, reference will now be made to the accompanying drawings which illustrate a preferred embodiment thereof and wherein:-

Figure 1:
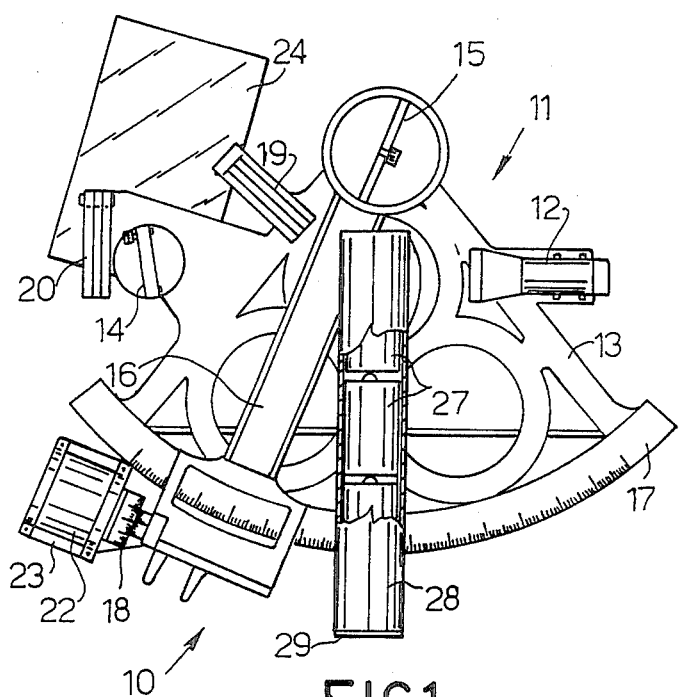
FIGS. 1 and 2 are respective opposite side elevational views of a navigation system according to the present invention.
Figure 3:
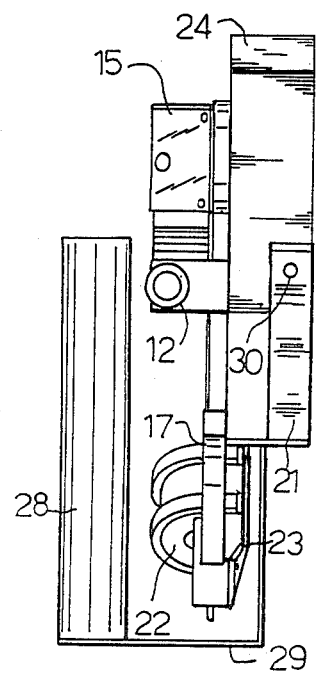
FIG. 3 is an end view of the system illustrated in FIG. 1.
Figure 2:
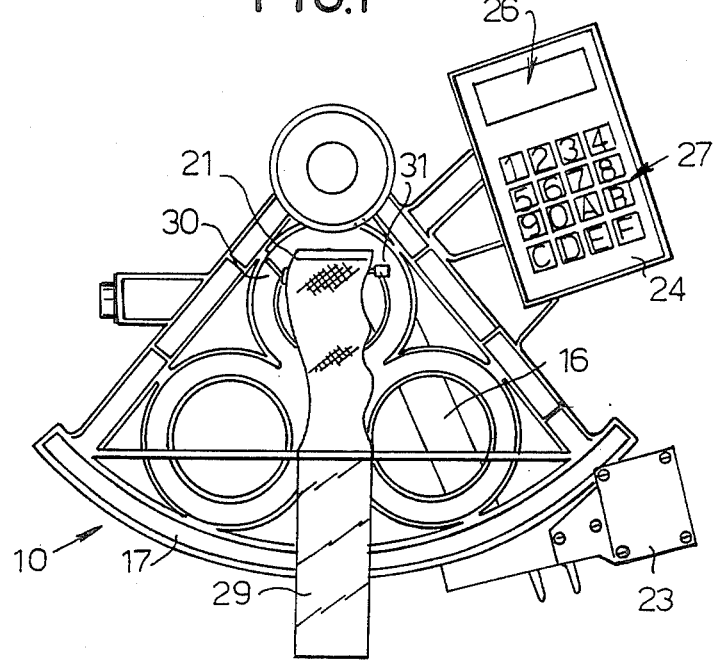
Figure 4:
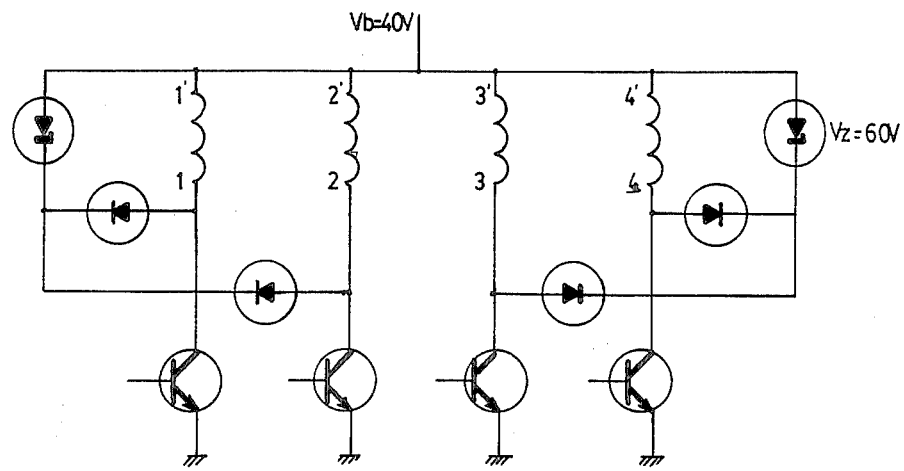
FIG. 4 is a schematic view illustrating a block diagram of the circuit of the system.
Figure 5:
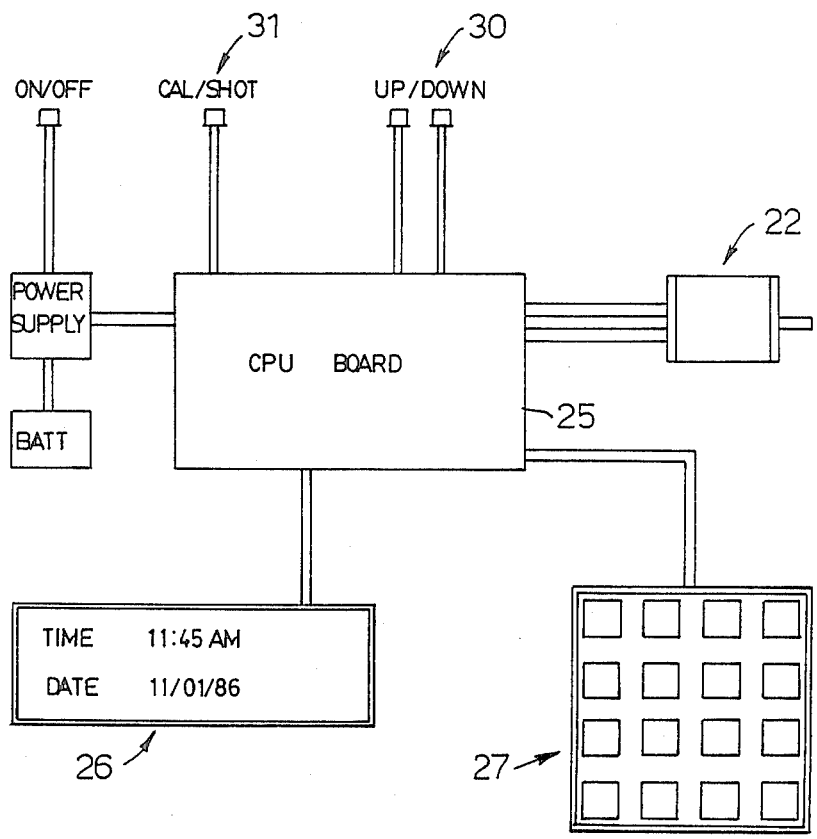
FIG. 5 is a typical drive circuit for the stepping motor of the system.
Figure 7:
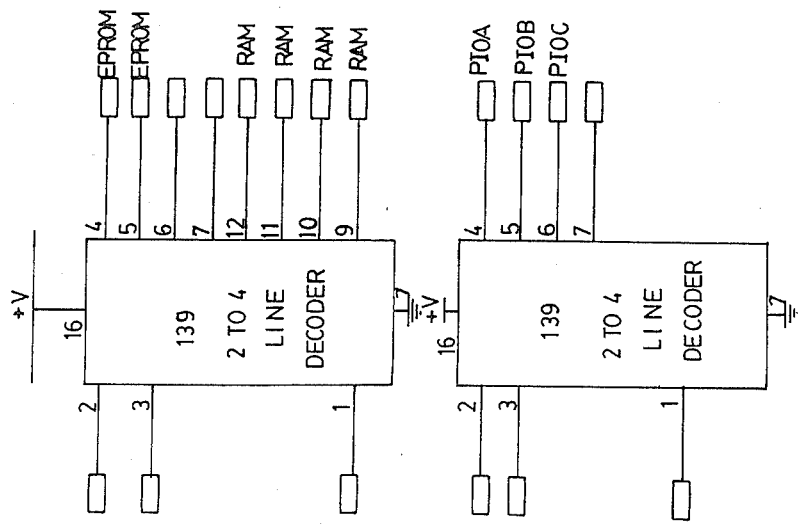
FIGS. 6–11 illustrate further details of the control circuit for the system.
Figure 6:
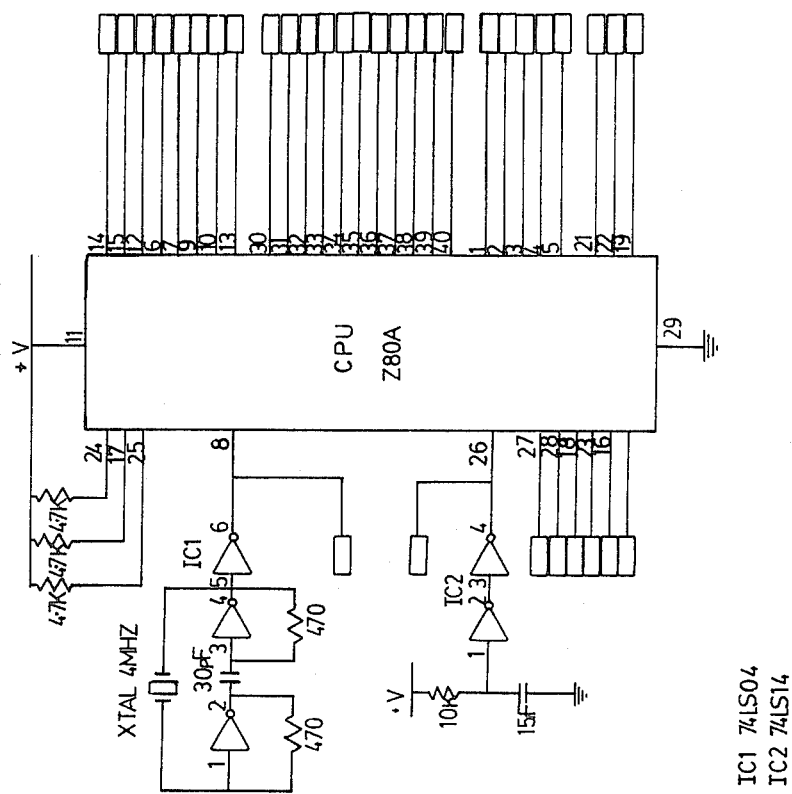
Figure 8:
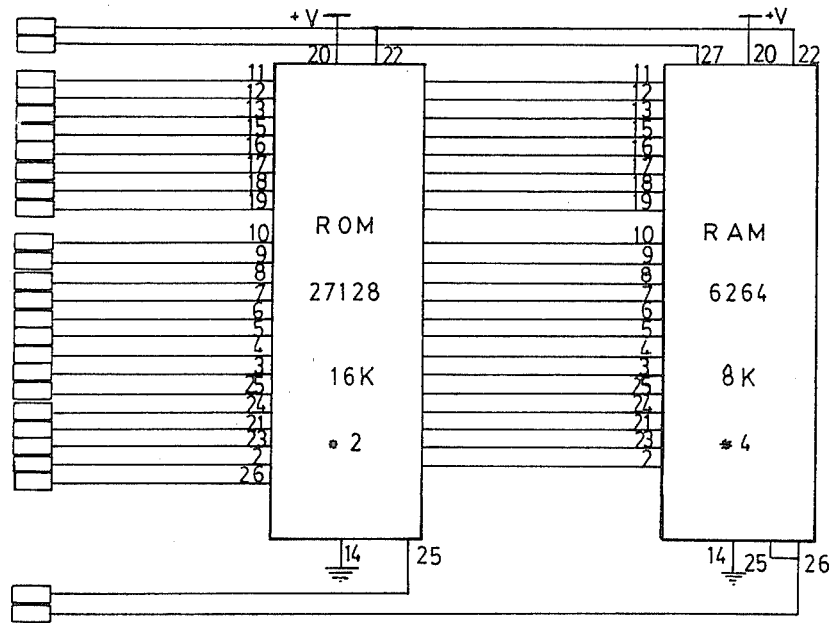
Figure 9:
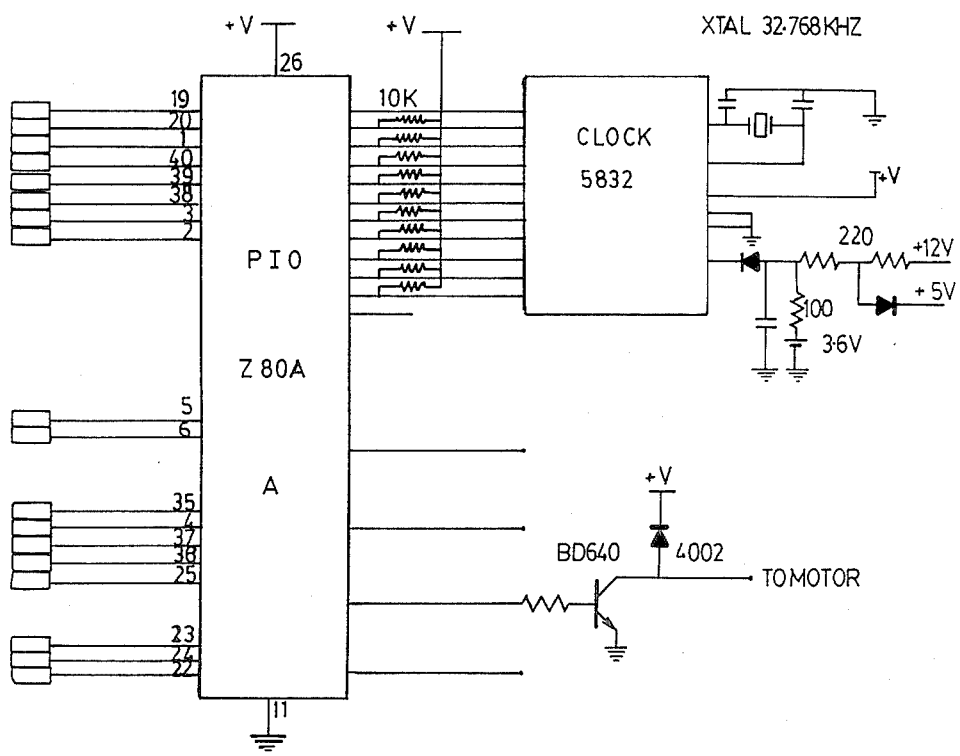
Figure 10:
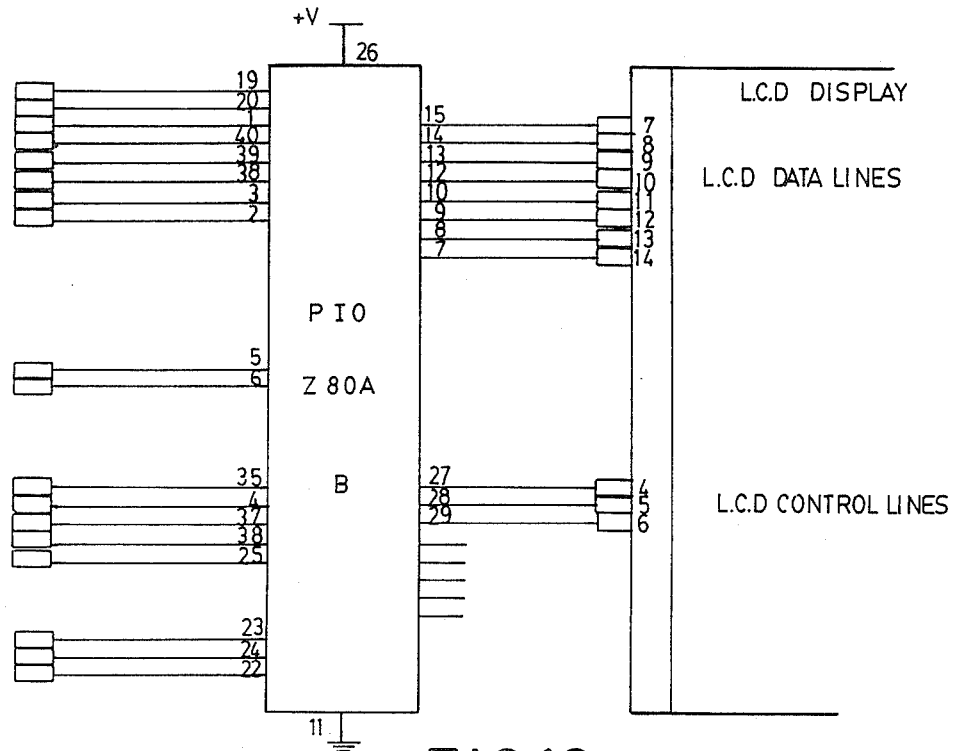
Figure 11:
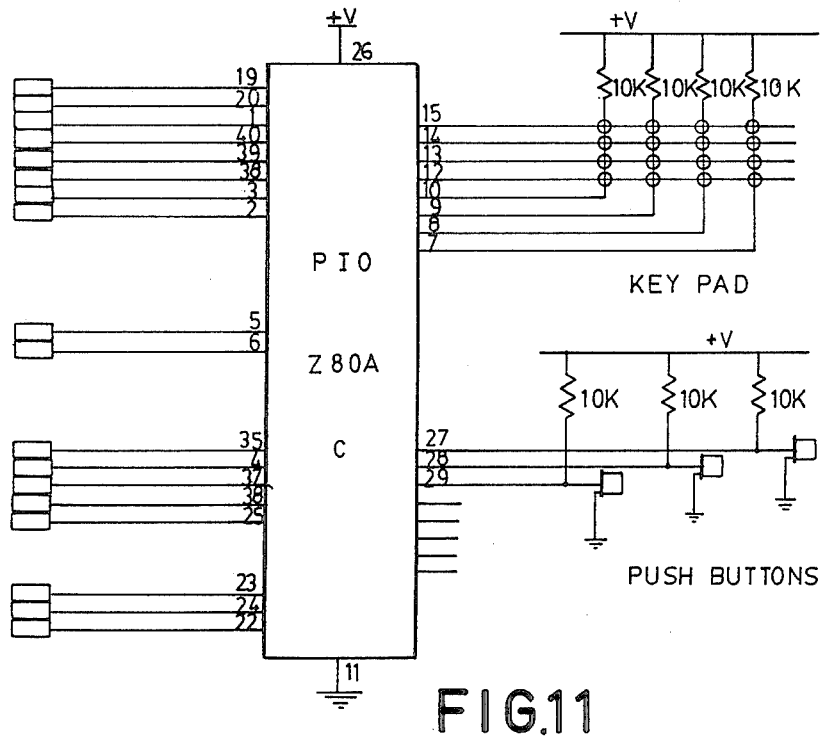

Referring to the drawings and firstly to FIGS. 1 and 2, there is illustrated a navigational system 10 according to the present invention which in this instance includes a sextant 11 of conventional form having a sight telescope 12 supported on the frame 13 of the sextant, a fixed split horizon mirror 14 through which the horizon may be sighted and a reflected image of the celestial body being observed may be seen and an index mirror 15 supported on a pivotal index arm 16 and arranged to reflect an image of the celestial body onto the fixed horizon mirror for viewing through the telescope 12.

As is conventional, the sextant 11 also includes an arc 17 which is graduated in degrees and the extent of pivotal movement of the index arm and thus movable mirror 15 may be read from the arc so as to determine the angle which the celestial body being observed is above the horizon.

Suitably the sextant is also provided with a micrometer 18 which engages with teeth on the arc 17 and which is normally graduated in minutes for fine adjustment of the index arm 16 so as to enable an accurate reading of this angle. The sextant 11 normally also includes filtering shades 19 and 20 associated with the mirrors 14 and 15 to reduce glare for example if the sun is being observed and a handle 21 so that the instrument can be gripped by the right hand of the arm when in use.

In accordance with a preferred form of the present invention, a stepping motor 22 is linked to the micrometer 18 and preferably supported on the index arm 16 by means of a bracket 23 secured releasably to the arm and is arranged to cause pivotal movement of the index arm 16 and consequently the index mirror 15. The stepping motor 22 in this embodiment is a Philips type 9904 115 23 stepping motor and responds to digital input pulses or groups of pulses to cause rotation of the motor spindle in discrete angular steps. Suitable the spindle of the stepping motor 22 is coupled with a tubular coaxial extension of the micrometer and engaged positively for movement therewith by means of a grub screw. Of course, the spindle of the stepping motor may be keyed to the micrometer 18 in any suitable fashion.

Also supported on the sextant frame 13 is a casing 24 which houses a microprocessor unit 25 which is programmed with information from navigation tables such as Sight Reduction Tables and the Nautical Almanac and the microprocessor 25 is associated with a key board 26 and liquid crystal display 27 mounted on the casing 24.

Also associated with the microprocessor unit is a real time calendar clock so that the microprocessor can calculate from known celestial navigation formula, geographical positions in accordance with the signal applied to the stepping motor 22 and time at which the heavenly body is observed.

Suitably the stepping motor 22 and microprocessor 25 are powered from a rechargeable battery supply which in this instance comprise three rechargeable lead acid batteries 27 arranged in an upstanding hollow housing 28 supported on a bracket 29 extending beneath the sextant from the handle 21 of the sextant 11. Alternatively the bracket 29 may extend over the index mirror of the sextant and support the housing 28 for power supply. In ,each case the battery housing 28 defines a further handle for the sextant so that the handle 21 may be gripped with one hand and the battery housing 28 with the other hand when the instrument is in use. Of course suitable cables (not shown) extend from the battery housing 28 to the microprocessor housing 24 whilst cables for the stepping motor 22 extend along the index arm 16 to the housing 24.

A pair of switches are supported on opposite sides of the handle 21 of the sextant, one switch 30 comprising a switch for actuating the stepping motor and the other switch 31 ccmprising a "shot" switch which when depressed initiates operation of the microprocessor 25 to calculate position.

Figure 12:
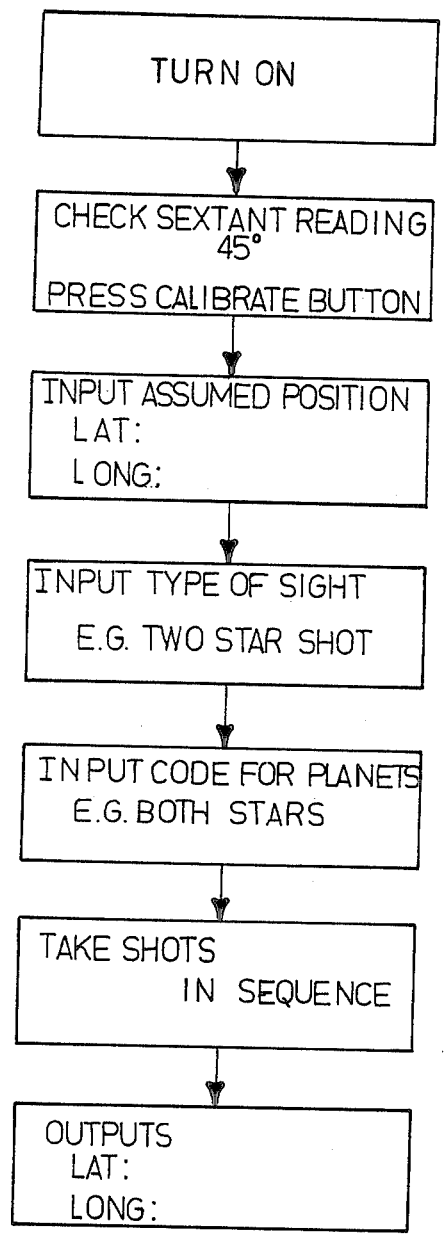
FIG. 12 is a flow diagram illustrating the steps involved in using the system to obtain a geographical position.

FIGS. 6 to 11 illustate detailed schematic diagrams of the control circuitry for the navigational system and the operation thereof will be hereinunder described with reference to the flow diagram illustrated in FIG. 12.

Initially, the instrument is switched on by means of say an off/on switch located on the housing 24 and when actuated, this switch applies power from the batteries to the control circuit. To calibrate the system, the index arm 16 is moved either manually or with the aid of the stepping motor 22 to the 45° position which in this instance is selected as the central zero calibration position. Selected keys on the keyboard 27 are then depressed and the memories of the control circuits inputed with the 45° reading. The assumed position from which the shot is to be taken is then inputed into the control circuit in the form of longitude and latitude readings which are displayed on the LCD display 26.

The type of sight which is to be undertaken is then punched into the keyboard so that the microprocessor will select the correct program for calculation of position. For this purpose respective keys of the keyboard may be designated in accordance with selected types of sights to be taken e.g. Key 1 may designate a single shot, Key 2 a 2 star shot up to Key 5 a 5 star shot, Key 6 a noon shot and Key 7 a single shot of the sun at dawn or dusk. The actual type of sight selected is also displayed on the LCD display 26.

The planets or stars from which the sights are to be taken are then punched into the keyboard again in accordance with a code ascribed to each planet e.g. Key 1 may be ascribed to a first star, Key 2 to a second star etc. Again when the selected code key is punched, the planet or star is identified and are displayed on the LCD display 26.

A sight of each star or planet is then taken in sequence. For this purpose the sextant 11 is used in the normal manner with the reflected image of the star for which the sight is taken being brought down to the horizontal. However in this case, the index arm 16 is pivoted by actuation of the toggle switch 30 in the desired direction so that positive or negative control pulses will be applied to the stepping motor 22 to cause rotation thereof and consequently movement of the index arm in opposite directions. This is continued until the star image is visually observed through the telescope to be brought down to the horizon.

Preferably, the toggle switch 30 is arranged to either apply single pulses to the stepping motor to obtain fine adjustment whilst courser adjustment can be obtained by depressing the switch 30 and maintaining the switch depressed. This will cause continually increasing rate of pulses to be applied to the stepping motor 22 and acceleration thereof. Circuits to achieve this operation are well known in the art.

When the image of the selected star is brought down to the horizon, the shot button 31 is depressed so that the microprocessor reads the number of pulses applied to stepping motor 22 and also at the same time reads the chronometer reading. Furthermore, when the switch 31 is depressed, the LCD display 26 will display in degrees the angle altitude of the star so that if necessary manual calculation of position can be undertaken. This procedure is then repeated for the second star and after the shot is taken in the same manner as above, the microprocessor will, using known navigational equations calculate the position from where the shot is taken. After this procedure is completed, the microprocessor will cause the stepping motor 22 to move back to the 45° position so that an error check can be made.

Suitably the microprocessor is preprogrammed to take into account any error corrections required such as eye height above the horizon and known sextant error. Alternatively, these error corrections can be entered into the keyboard during use of the device.

Preferably the stepping motor has for accuracy four hundred (400) steps per revolution which translates to 9 seconds of arc ±5% per step so that high accuracy can be achieved.

The Nautical Almanac programs are preferably updated automatically yearly by the microprocessor whilst the chronometer may be provided with a back up power supply to ensure continued accurate operation. Suitably the control unit for the system comprises a Z80A CPU running at 4MHZ with 32K EPROM and 32K Static RAM. The LCD display preferably is a 20×2 line 40 character display and the keyboard comprises a flat membrane type 16 key hex pad layout.

The control system of course can be applied to any sextant and furthermore the arrangement is preferably made such that the sextant may be used manually in the event of breakdown. For this purpose the stepping motor 22 and bracket 23 may be simply removed from the instrument by release of appropriate attachment screws.

If necessary, a printer may be associated with the microprocessor control unit so as to obtain a printout of lattitude and longitude. Other means may of course be employed for sensing angular displacement of the index arm such as variable resistance means. All such variations and modifications as would be apparent to persons skilled in the art are deemed to fall within the spirit and scope of the invention.

I claim:

1. A sextant of the type having a support frame including a graduated arc, an eye piece mounted on said support frame, a split horizon mirror mounted in a fixed position on said support frame in the line of sight of said eye piece, an index arm pivotally supported on said support frame, an index mirror fixedly supported on said index arm, micrometer means mounted on said index arm and cooperable with said graduated arc to vary the pivotal position of said index arm and said index mirror and thus the position of an image of heavenly body being observed via said horizon mirror through said eye piece, and wherein the improvement comprises a stepping motor having a drive shaft, means supportig said stepping motor on said index arm, means for coupling said drive shaft of said stepping motor to said micrometer means, and control means for controlling the operation of said stepping motor, said control means including pulse generating means for generating a plurality of pulses, first switch means selectively actuable to apply said pulses from said pulse generating means to said stepping motor to cause rotation thereof in discrete steps and through said micrometer means, pivotal movement of said index arm and said index mirror so that the image of said heavenly body reflected through said index and horizon mirrors as viewed through said eye piece may be moved towards the horizon, monitoring means for monitoring said pulses applied to said stepping motor upon actuation of said first switch means, said monitored pulses being proportional to the angle of movement of said index arm and index mirror, means for storing predetermined data relating to the position of said heavenly body, chronometer means, calculating means for calculating sextant sight position from celestial navigation equations, and second switch means, said second switch means being adapted to be actuated when said image of said heavenly body reaches the horizon as viewed through said eye piece, actuation of said second switch means causing said monitored pulses applied to said stepping motor and indicative of the altitude angle of said heavenly body and said chronometer means at the time of actuation of said second switch means to be read by said calculating means, and said calculating means being operable to calculate from said readings and said stored data, said sextant sight position, and visual display means for displaying said sextant sight position.

2. A sextant according to claim 1 and including first handle means fixed to and disposed on one side of said support frame and wherein said first and second switch means are mounted on said handle means.

3. A sextant according to claim 2 and including further handle means fixed to said support frame and disposed on the opposite side of said support frame, said handle means being hollow and being adapted to support therein battery means for power supply for said stepping motor.

4. A sextant according to claim 1 wherein said storing means stores data relating to the position of a plurality of said heavenly bodies and wherein said calculating means is operable to calculate said sextant sight position from monitored pulses indicative of the altitude angle of respective said heavenly bodies consequent upon respective actuations of said first and second switch means and the respective readings of said chronometer means at the respective times of actuation of said second switch means.

5. A sextant of the type having a support frame, an eye piece mounted on said support frame, a split horizon mirror mounted in a fixed position on said support frame in the line of sight of said eye piece, an index arm pivotally supported on said support frame, and an index mirror fixedly supported on said index arm whereby pivotal movement of said index arm causes variation of the position of the image of a heavenly body as observed via said index and horizon mirrors through said eye piece, and wherein the improvement comprises stepping motor means, means for supporting said stepping motor means on said sextant, means for coupling said stepping motor means to said index arm so that actuation thereof causes pivotal movement of said index arm, and microprocessor means for controlling operation of said sextant, means for generating a plurality of pulses, first switch means selectively actuable to apply said pulses to said stepping motor means to cause actuation thereof and thereby pivotal movement of said index arm and said index mirror so that said image of said heavenly body reflected through said index and horizon mirrors as observed through said eye piece may be moved towards the horizon, said microprocessor means including means for monitoring said pulses applied to said stepping motor means, said monitored pulses being proportional to the angle of movement of said index arm and index mirror, said microprocessor means including means for storing predetermined data relating to the position of said heavenly body, real time calendar clock means, and said microprocessor means including means for calculating sextant sight position from celestial navigation equations; second switch means, said second switch means being adapted to be actuated when said image of said heavenly body reaches the horizon as viewed through said eye piece to cause said microprocessor means to read said monitored pulses indicative of the altitude angle of said heavenly body and said clock means, and said microprocessor means being operable to calculate from said readings and said stored data, said sextant sight position.

6. A sextant according to claim 5 and including visual display means associated with said microprocessor means for displaying said sextant sight position after calculation thereof by said microprocessor means.

7. A sextant according to claim 6 and including a housing fixed to said support frame and wherein said microprocessor means and said visual display means are supported in said housing.

8. A sextant of the type including support means, an eye piece mounted on said support means, a horizon mirror mounted in a fixed position on said support means in the line of sight of said eye piece, and an index mirror pivotally mounted on said support means such that pivotal movement of said index mirror causes variation of the position of the image of a heavenly body as observed via said index and horizon mirrors through said eye piece, and wherein the improvement comprises stepping motor means, means for supporting said stepping motor means on said sextant, means for coupling said stepping motor means to said index mirror so that actuation thereof causes pivotal movement of said index mirror, and means for controlling the operation of said sextant comprising means for generating a plurality of pulses, first switch means selectively actuable to apply said pulses to said stepping motor means to cause actuation thereof and thereby pivotal movement of said index mirror so that the image of said heavenly body observed via said index and horizon mirrors through said eye piece may be moved towards the horizon, means for monitoring said pulses applied to said stepping motor means, said monitored pulses being proportional to the angle of movement of said index mirror, means for storing predetermined data relating to the position of said heavenly body, real time clock means, and means for calculating geographical position from celestial navigation equations; second switch means, said second switch means being adapted to be actuated when said image of said heavenly body reaches the horizon as viewed through said eye piece as a result of actuation of said first switch means, actuation of said second switch means causing said calculating means to read said monitored pulses indicative of the altitude angle of said heavenly body and said clock means, and said calculating means being operable to calculate from said readings and said stored data, said sextant sight position.

9. A sextant according to claim 8 wherein said storing means stores predetermined data relating to a plurality of said heavenly bodies and wherein said calculating means is operable to calculate from said readings of a plurality of said heavenly bodies, said sextant sight position.

* * * * *